(12) United States Patent
Ue et al.

(10) Patent No.: US 10,608,572 B2
(45) Date of Patent: Mar. 31, 2020

(54) MOTOR DRIVE CONTROL DEVICE

(71) Applicant: Nidec Corporation, Kyoto (JP)

(72) Inventors: Kazumasa Ue, Kyoto (JP); Kazuya Matsuzaki, Kyoto (JP); Ryogo Mochizuki, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 15 days.

(21) Appl. No.: 16/147,940

(22) Filed: Oct. 1, 2018

(65) Prior Publication Data

US 2019/0131910 A1    May 2, 2019

(30) Foreign Application Priority Data

Oct. 31, 2017 (JP) .................. 2017-211186
Sep. 21, 2018 (JP) .................. 2018-177308

(51) Int. Cl.
| | | |
|---|---|---|
| H02P 21/00 | (2016.01) | |
| H02P 27/12 | (2006.01) | |
| H02P 21/22 | (2016.01) | |
| H02M 1/38 | (2007.01) | |
| H02P 21/09 | (2016.01) | |
| H02P 21/18 | (2016.01) | |
| H02M 7/5387 | (2007.01) | |
| H02M 7/5395 | (2006.01) | |

(52) U.S. Cl.
CPC .............. *H02P 27/12* (2013.01); *H02M 1/38* (2013.01); *H02M 7/53871* (2013.01); *H02P 21/09* (2016.02); *H02P 21/18* (2016.02); *H02P 21/22* (2016.02); *H02M 7/5395* (2013.01); *H02M 2001/385* (2013.01)

(58) Field of Classification Search
CPC .......... H02M 2001/385; H02M 7/5395; H02P 27/08; H02P 21/24
See application file for complete search history.

(56) References Cited

U.S. PATENT DOCUMENTS

2011/0156632 A1*   6/2011   Cheng .................. H02P 27/047
                                                                        318/808

FOREIGN PATENT DOCUMENTS

| JP | 63-174571 A | 7/1988 |
|---|---|---|
| JP | 9-261974 A | 10/1997 |
| JP | 2000-134942 A | 5/2000 |
| JP | 2006-42480 A | 2/2006 |
| JP | 2006-320122 A | 11/2006 |

(Continued)

*Primary Examiner* — Karen Masih
(74) *Attorney, Agent, or Firm* — Keating & Bennett

(57) ABSTRACT

A motor drive control device that drives and controls a motor by using a PWM inverter includes a dead time compensation portion that obtains a compensation amount to compensate for an error of an output voltage of the PWM inverter generated when a dead time to avoid simultaneous turning-on of respective switching elements mutually connected in series in the PWM inverter is prepared and outputs a voltage command obtained by taking the compensation amount into account to the PWM inverter. The dead time compensation portion obtains the compensation amount based on a magnitude of a current command vector indicating a vector of a current to be followed by a current flowing through the motor. The current command vector is a vector defined by a coordinate system in synchronism with a rotor of the motor or its equivalent coordinate system.

9 Claims, 17 Drawing Sheets

(56) References Cited

FOREIGN PATENT DOCUMENTS

| JP | 2011-55608 A | 3/2011 |
| JP | 2012-175866 A | 9/2012 |
| JP | 2017-28850 A | 2/2017 |

* cited by examiner

MOTOR DRIVE CONTROL DEVICE

CROSS REFERENCE TO RELATED APPLICATIONS

This application claims the benefit of priority to Japanese Patent Application No. 2017-211186 filed on Oct. 31, 2017 and Japanese Patent Application No. 2018-177308 filed on Sep. 21, 2018. The entire contents of these applications are hereby incorporated herein by reference.

BACKGROUND OF THE INVENTION

1. Field of the Invention

The present disclosure relates to a motor drive control device.

2. Description of the Related Art

In an inverter circuit that outputs a drive voltage to a motor, when switching on and off of respective switching elements in upper and lower stages which are connected in series to each other is to be performed, to avoid short-circuit after the above-mentioned respective switching elements are turned on at the same time, a period during which both of the above-mentioned respective switching elements are turned off is normally prepared. The above-mentioned period is generally referred to as a dead time. At a timing of the dead time, a current tends to continue flowing by an inductance of the motor and a flyback diode of the inverter circuit. A difference between a voltage desired to be output from the inverter circuit to the motor and a voltage actually output to the motor may be generated depending on a flowing direction of the current. The above-mentioned difference will be hereinafter referred to as an "error of the output voltage". Up to now, dead time compensation is generally performed for compensating the above-mentioned error of the output voltage which is generated when the dead time is prepared.

For example, Japanese Laid-open Patent Application Publication No. 9-261974 and Japanese Laid-open Patent Application Publication No. 2011-55608 describe technologies for performing the dead time compensation by respectively adding or subtracting dead time compensation amounts in the respective phases with respect to respective voltage command values in three phases to input respective voltage command values after the addition or subtraction to a pulse width modulation (PWM) circuit, and turning the respective switching elements (for example, transistors) of the inverter circuit on and off by PWM control.

In particular, Japanese Laid-open Patent Application Publication No. 9-261974 describes a configuration in which, when the dead time compensation is performed, current command values iu*, iv*, and iw* in three phases are calculated from current command values id* and iq* in two-phase, and dead time compensation amounts ed(iu*), ed(iv*), and ed(iw*) are calculated by using the current command values iu*, iv*, and in the three phases. Furthermore, Japanese Laid-open Patent Application Publication No. 9-261974 also describes a configuration in which actual output current values (for the three phases) of the inverter circuit are detected, a current error between the current command values id* and iq* in the two phases and the actual output current values (current values after coordinate conversion from the three phases into the two phases) is calculated, voltage command values ed* and eq* in accordance with the above-mentioned current error are output, the voltage command values ed* and eq* are converted into voltage command values eu*, ev*, and ew* in the three phases, and the dead time compensation amounts ed(iu*), ed(iv*), and ed(iw*) are respectively added to the voltage command values eu*, ev*, and ew*.

Japanese Laid-open Patent Application Publication No. 2011-55608 also describes a configuration in which a dead time compensation voltage is added or subtracted with respect to a voltage command on the basis of a determination result as to whether a PWM pulse corresponds to an interval where a state is changed from on to off or an interval where the state is changed from off to on and a current detection value of the motor, and a voltage command after the compensation is generated.

Up to now, when the dead time compensation is performed, as in Japanese Laid-open Patent Application Publication No. 9-261974 and Japanese Laid-open Patent Application Publication No. 2011-55608, the output current value of the inverter circuit (current detection value of the motor) is to be obtained, in other words, a phase current of the motor is to be detected. Furthermore, according to Japanese Laid-open Patent Application Publication No. 9-261974, when the dead time compensation is performed, complicated coordinate conversion processing for converting the current command values id* and iq* in the two phases into the current command values iu*, iv*, and iw* in the three phases is to be performed. For this reason, up to now, it is not easy to perform the dead time compensation.

The present disclosure has been made in view of the above-mentioned aspects and aims at providing a motor drive control device in which the dead time compensation can be easily performed without performing the detection of the phase current of the motor and the complicated coordinate conversion processing.

SUMMARY OF THE INVENTION

A motor drive control device according to an exemplary embodiment of the present disclosure relates to a motor drive control device that drives and controls a motor by using a pulse width modulation (PWM) inverter that converts a voltage command into a PWM pulse and outputs a voltage to the motor by switching on and off of respective switching elements connected in series to each other by the PWM pulse, the motor drive control device including a dead time compensation portion that obtains a compensation amount to compensate for an error of the output voltage of the PWM inverter which is generated when a dead time to avoid simultaneous turning-on of the respective switching elements connected in series to each other is prepared in the PWM inverter and outputs the voltage command obtained by taking the compensation amount into account to the PWM inverter, the dead time compensation portion obtains the compensation amount on a basis of a magnitude of a current command vector indicating a vector of a current to be followed by the current flowing through the motor, and the current command vector is a vector defined by a coordinate system in synchronism with a rotor of the motor or its equivalent coordinate system.

According to the above-mentioned configuration, it is possible to easily perform the dead time compensation without performing the detection of the phase current and the complicated coordinate conversion processing related to the current commands.

The above and other elements, features, steps, characteristics and advantages of the present disclosure will become more apparent from the following detailed description of the preferred embodiments with reference to the attached drawings.

DETAILED DESCRIPTION OF THE PREFERRED EMBODIMENTS

Hereinafter, exemplary embodiments of the present disclosure will be described in detail with reference to the drawings. It should be noted that, according to the present embodiment, a value of a voltage command (voltage command value) will also be simply referred to as a voltage command, and a value of a current command (current command value) will also be simply referred to as a current command.

Figure 1:
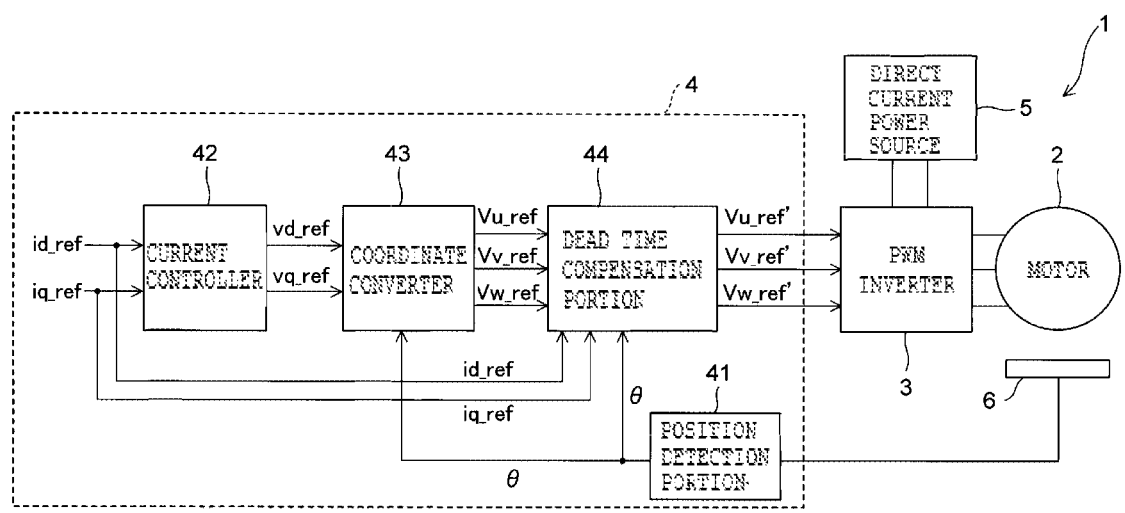
FIG. 1 is a block diagram illustrating an entire configuration of a motor drive system according to an exemplary embodiment of the present disclosure.
Figure 2:
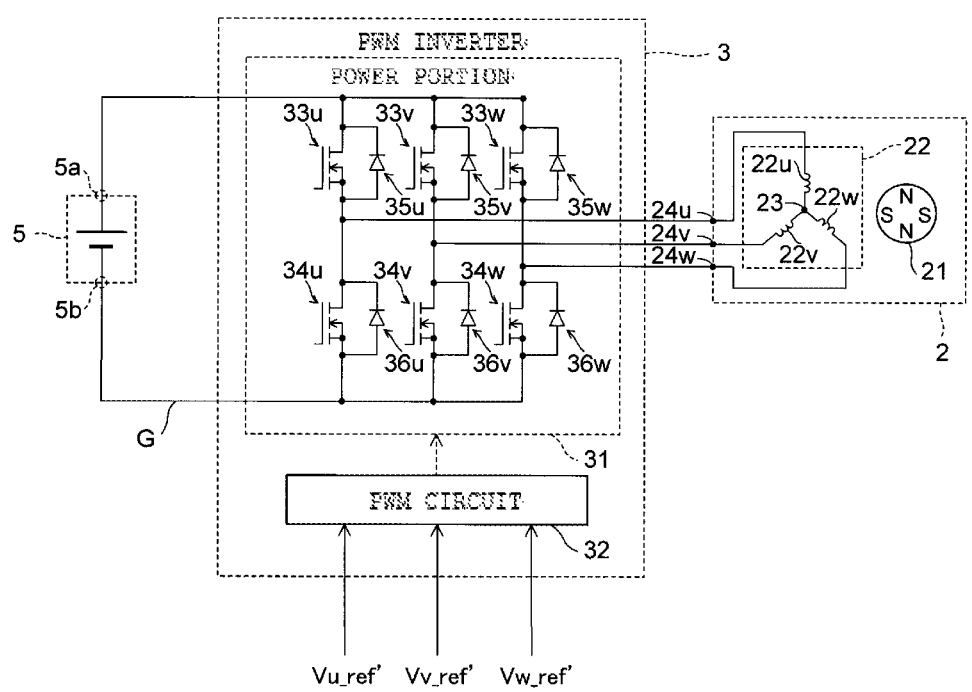
FIG. 2 is a circuit diagram illustrating a portion of the above-mentioned motor drive system.

FIG. 1 is a block diagram illustrating an entire configuration of a motor drive system 1 according to an exemplary embodiment of the present disclosure, and FIG. 2 is a circuit diagram illustrating a part of the motor drive system 1. The motor drive system 1 is provided with a motor 2, a PWM inverter 3, a motor drive control device 4, a direct-current (DC) power source 5, and a position sensor 6. It should be noted that a detail of the motor drive control device 4 will be described below. As illustrated in FIG. 2, while a negative output terminal 5b is set as a low voltage side, the DC power source 5 outputs a DC voltage between a positive output terminal 5a and the negative output terminal 5b.

The motor 2 is constituted by a three-phase brushless DC motor (BLDC motor), for example. More specifically, as illustrated in FIG. 2, the motor 2 is provided with a rotor 21 in which a permanent magnet is arranged and a stator 22 in which armature windings 22u, 22v, and 22w in a U phase, a V phase, and a W phase are arranged. The armature windings 22u, 22v, and 22w establish Y-connection while a neutral point 23 is set as a center. Non-connection terminals on an opposite side to the neutral point 23 in the armature windings 22u, 22v, and 22w are respectively connected to terminals 24u, 24v, and 24w.

The PWM inverter 3 is provided with a power portion 31 and a PWM circuit 32. The PWM circuit 32 performs the PWM control on the power portion 31 on the basis of voltage commands Vu_ref', Vv_ref', and Vw_ref' output from the motor drive control device 4. It should be noted that the voltage commands Vu_ref', Vv_ref', and Vw_ref' are voltage commands obtained by taking into account a compensation amount of the dead time obtained by a method which will be described below.

The power portion 31 is provided with a half bridge circuit for the U phase, a half bridge circuit for the V phase, and a half bridge circuit for the W phase. Each of the half bridge circuits includes a pair of switching elements. The pair of switching elements in each of the half bridge circuits is connected in series between the positive output terminal 5a and the negative output terminal 5b of the DC power source 5, and the DC voltage from the DC power source 5 is applied to each of the half bridge circuits. Each of the switching elements is constituted by a field effect transistor, for example, but may also be constituted by another transistor such as an insulated gate bipolar transistor (IGBT).

The half bridge circuit for the U phase is provided with a switching element 33u on a high voltage side and a switching element 34u on a low voltage side which are mutually connected in series. The half bridge circuit for the V phase is provided with a switching element 33v on the high voltage side and a switching element 34v on the low voltage side which are mutually connected in series. The half bridge circuit for the W phase is provided with a switching element 33w on the high voltage side and a switching element 34w on the low voltage side which are mutually connected in series.

Diodes 35u, 35v, and 35w are respectively connected in parallel to the switching elements 33u, 33v, and 33w on the high voltage side while a direction from the low voltage side towards the high voltage side of the DC power source 5 is set as a forward direction. Similarly, diodes 36u, 36v, and 36w are respectively connected in parallel to the switching elements 34u, 34v, and 34w on the low voltage side while a direction from the low voltage side towards the high voltage side of the DC power source 5 is set as the forward direction. Each of the diodes 35u, 35v, 35w, 36u, 36v, and 36w functions as a flyback diode (freewheel diode).

A connection point of the switching element 33u and the switching element 34u which are connected in series to each other is connected to the terminal 24u. Similarly, a connection point of the switching element 33v and the switching element 34v which are connected in series to each other is connected to the terminal 24v, and a connection point of the switching element 33w and the switching element 34w which are connected in series to each other is connected to the terminal 24w.

The PWM circuit 32 generates PWM pulses (pulse width modulation signals) with respect to the respective phases on the basis of the voltage commands Vu_ref', Vv_ref', and Vw_ref' in the three phases (the U phase, the V phase, and the W phase) and supplies the above-mentioned PWM pulses to a control terminal (a gate or a base) of each of the switching elements of the power portion 31. With this configuration, it is possible to switch on (continuity state) and off (non-continuity state) of the above-mentioned respective switching elements.

Therefore, with regard to the DC voltage from the DC power source 5, in the PWM inverter 3, since the voltage is applied to the motor 2 by switching operations of the respective switching elements in accordance with the above-mentioned PWM pulses, currents in accordance with the voltages in the three phases flow through the respective armature windings 22u, 22v, and 22w of the motor 2 to drive the motor 2. It should be noted that a relationship between the switching operations of the above-mentioned respective switching elements and a current (phase current) flowing through the motor 2 will be described below.

From the above-mentioned aspects, it can be mentioned that the PWM inverter 3 according to the present embodiment has a configuration for converting the voltage commands Vu_ref', Vv_ref', and Vw_ref' into the PWM pulses and outputting the voltage to the motor 2 by switching on and off of the respective switching elements connected in series by the PWM pulses.

The position sensor 6 illustrated in FIG. 1 is a sensor that outputs a signal in accordance with a rotation position of the rotor 21 of the motor 2, and a rotary encoder or a Hall element is used, for example. The signal output from the position sensor is input to the motor drive control device 4 which will be described below.

Next, a relationship between the switching operations of the respective switching elements in the power portion 31 of the PWM inverter 3 and a phase current of the motor 2 will be described. It should be noted that, for convenience in the descriptions, a line connecting the respective switching elements 34u, 34v, and 34w on the low voltage side in the power portion 31 to the negative output terminal 5b of the DC power source 5 will be hereinafter referred to as a generating line G. A current flowing through the generating line G will be referred to as a generating line current.

Currents flowing through the armature windings 22u, 22v, and 22w of the motor 2 will be respectively referred to as a U-phase current, a V-phase current, and a W-phase current, and each of those currents will be referred to as (or those currents will be collectively referred to as) a phase current. With regard to a polarity of the phase current, the polarity of the phase current in a direction flowing from the terminal 24u, 24v, or 24w into the neutral point 23 is set as positive, and the polarity of the phase current in a direction flowing out of the neutral point 23 is set as negative.

Figure 3:
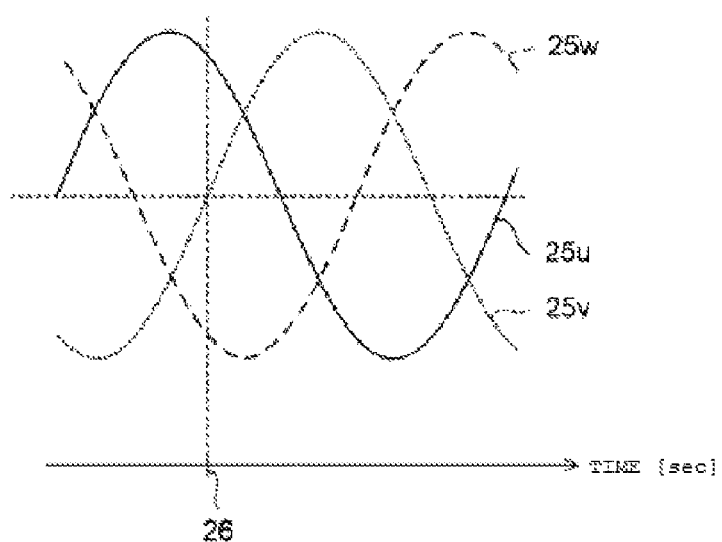
FIG. 3 is an explanatory diagram illustrating examples of waveforms of alternating-current (AC) voltages in three phases applied to the motor in the above-mentioned motor drive system.

FIG. 3 is an explanatory diagram illustrating examples of waveforms of AC voltages in three phases applied to the motor 2. FIG. 3 illustrates respective waveforms 25u, 25v, and 25w of a U-phase voltage, a V-phase voltage, and a W-phase voltage to be applied to the motor 2. It should be noted that each of the U-phase voltage, the V-phase voltage, and the W-phase voltage will be also referred to as (or those voltages will be collectively referred to as) a phase voltage. In a case where a sinusoidal current flows through the motor 2, the output voltage of the PWM inverter 3 is set to be sinusoidal.

As illustrated in FIG. 3, high-low relationships in voltage levels among the U-phase voltage, the V-phase voltage, and the W-phase voltage change along an elapse of time. The above-mentioned high-low relationships are determined by the voltage commands Vu_ref', Vv_ref', and Vw_ref' in the three phases, and the PWM inverter 3 determines continuity patterns with respect to the respective phases on the basis of the voltage commands Vu_ref', Vv_ref', and Vw_ref' in the three phases.

Herein, the above-mentioned continuity patterns include the following eight patterns. A first continuity pattern is a continuity pattern in which the switching elements 34u, 34v, and 34w on the low voltage side in the U, V, and W phases are all turned on. A second continuity pattern is a continuity pattern in which the switching element 33w on the high voltage side in the W phase is turned on, and also the switching elements 34u and 34v on the low voltage side in the U phase and the V phase are turned on. A third continuity pattern is a continuity pattern in which the switching element 33v on the high voltage side in the V phase is turned on, and also the switching elements 34w and 34u on the low voltage side in the W phase and the U phase are turned on. A fourth continuity pattern is a continuity pattern in which the switching elements 33v and 33w on the high voltage side in the V phase and the W phase are turned on, and also the switching element 34u on the low voltage side in the U phase is turned on. A fifth continuity pattern is a continuity pattern in which the switching element 33u on the high voltage side in the U phase is turned on, and also the switching elements 34v and 34w on the low voltage side in the V phase and the W phase are turned on. A sixth continuity pattern is a continuity pattern in which the switching elements 33w and 33u on the high voltage side in the W phase and the U phase are turned on, and also the switching element 34v on the low voltage side in the V phase is turned on. A seventh continuity pattern is a continuity pattern in which the switching elements 33u and 33v on the high voltage side in the U phase and the V phase are turned on, and also the switching element 34w on the low voltage side in the W phase is turned on. An eighth continuity pattern is a continuity pattern in which the switching elements 33u, 33v, and 33w on the high voltage side in the U, V, and W phases are all turned on.

It should be noted that, in the two switching elements (which are connected in series to each other) in the same phase, when the dead time for avoiding the short-circuit caused by simultaneous turning-on of the switching element on the high voltage side and the switching element on the low voltage side is ignored, the switching element on the low voltage side is off in a period during which the switching element on the high voltage side is on, and the switching element on the low voltage side is on in a period during which the switching element on the high voltage side is off.

In actuality, the above-mentioned dead time is prepared when on and off of the respective switching elements are switched, but the switching element on the high voltage side and the switching element on the low voltage side in the same phase are simultaneously turned off in the period of the dead time. In addition, when the dead time is prepared, the error (error of the output voltage) between the voltage output from the PWM inverter 3 to the motor 2 and a voltage desired to be output (voltage command) is generated as described above. According to the present embodiment, the error of the output voltage is compensated by a dead time compensation portion 44 which will be described below.

Figure 4:
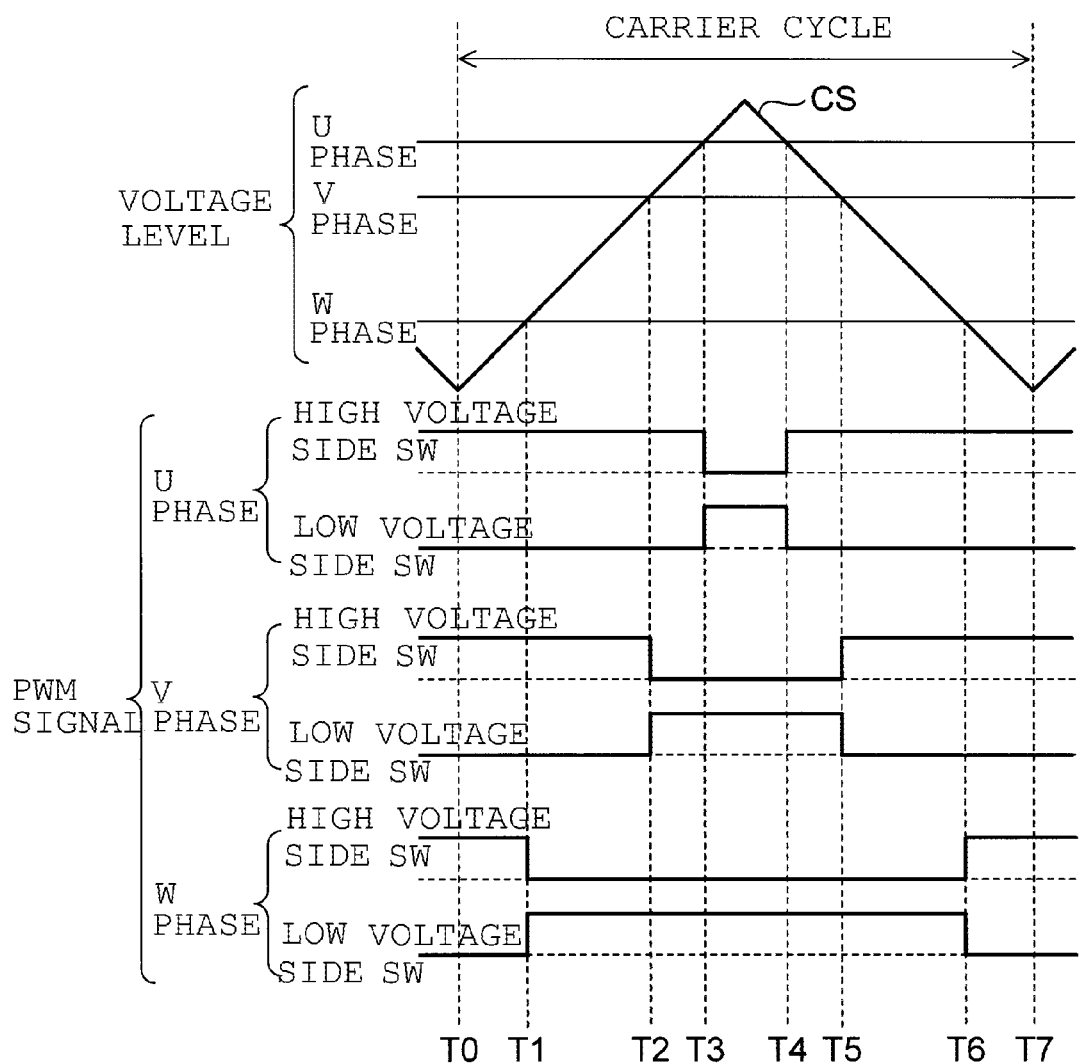
FIG. 4 is an explanatory diagram illustrating a relationship between voltage levels of respective phase voltages in PWM control and a carrier signal and waveforms of PWM pulses applied to the respective switching elements.
Figure 5A:
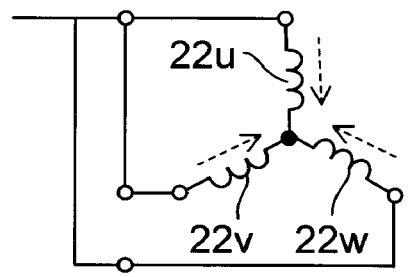
FIG. 5A illustrates an equivalent circuit on the periphery of an armature winding at a timing T0 to T1 of FIG. 4.
Figure 5B:
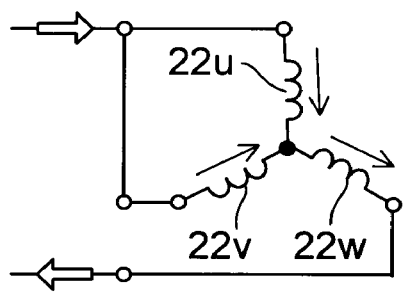
FIG. 5B illustrates the equivalent circuit on the periphery of the armature winding at a timing T1 to T2 of FIG. 4.
Figure 5C:
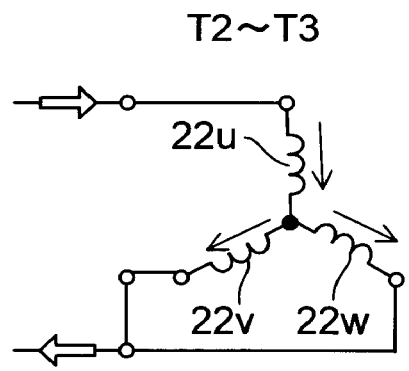
FIG. 5C illustrates the equivalent circuit on the periphery of the armature winding at a timing T2 to T3 of FIG. 4.
Figure 5D:
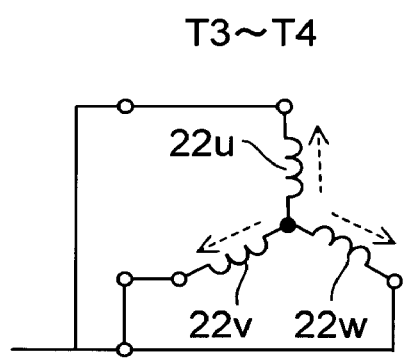
FIG. 5D illustrates the equivalent circuit on the periphery of the armature winding at a timing T3 to T4 of FIG. 4.

FIG. 4 is an explanatory diagram illustrating a relationship between the voltage levels of the respective phase voltages and a carrier signal in a case where the PWM control for the three phases is performed and waveforms of the PWM pulses applied to the respective switching elements. It should be noted that the above-mentioned dead time is ignored to simplify the descriptions herein. In addition, "high voltage side SW" and "low voltage side SW" in FIG. 4 respectively refer to the switching element on the high voltage side and the switching element on the low voltage side. Although the high-low relationships in the voltage levels among the respective phase voltages change in various manners, in FIG. 4, attention is focused on an arbitrary timing 26 in FIG. 3 for more specific descriptions. That is, FIG. 4 illustrates a case where the voltage level of the U-phase voltage is the highest, and also the voltage level of the W-phase voltage is the lowest.

In FIG. 4, the voltage levels of the respective phase voltages are compared with a carrier signal CS. The carrier signal is set as a cyclic triangular wave signal, and a cycle of the signal is referred to as a carrier cycle. It should be noted that, since the carrier cycle is significantly shorter than cycles of the current voltages in the three phases illustrated in FIG. 3, if a triangular wave of the carrier signal illustrated in FIG. 4 is represented on FIG. 3, the triangular wave appears as a single line.

FIGS. 5A to 5D illustrate equivalent circuits on the periphery of an armature winding at the respective timings of FIG. 4. A starting timing for each of the carrier cycles, that is, a timing at which the carrier signal is the lowest level is set as T0. At the timing T0, the switching elements 33*u*, 33*v*, and 33*w* on the high voltage side in the respective phases are set as on.

It should be noted that a period obtained by excluding a period between timings T1 and T6 from the carrier cycle represents a pulse width of the PWM pulse with respect to the switching element on the high voltage side in the W phase. A period obtained by excluding a period between timings T2 and T5 from the carrier cycle represents a pulse width of the PWM pulse with respect to the switching element on the high voltage side in the V phase. A period obtained by excluding a period between timings T3 and T4 from the carrier cycle represents a pulse width of the PWM pulse with respect to the switching element on the high voltage side in the U phase.

The case where the magnitude relationship of the voltage levels corresponds to the stated order of the U-phase voltage>the V-phase voltage>the W-phase voltage has been described as an example, but the phase current of the motor 2 can also be controlled by PWM control similar to the above-mentioned PWM control even in a case where the magnitude relationship of the voltage levels corresponds to other orders.

Specifically, the voltage commands Vu_ref', Vv_ref', and Vw_ref' in the U phase, the V phase, and the W phase are represented by count setting values CntU, CntV, and CntW of a counter (timer) which is not illustrated in the drawing in the PWM circuit 32. Higher phase voltages are assigned with higher count setting values. For example, in the case of FIG. 4, CntU>CntV>CntW is established.

The above-mentioned counter counts up the count value from 0 for every carrier cycle while the timing T0 is set as a reference. At a timing when the above-mentioned count value reaches CntW, a state is switched from a state in which the switching element 33*w* on the high voltage side in the W phase is on to a state in which the switching element 34*w* on the low voltage side is on. Subsequently, at a timing when the above-mentioned count value reaches CntV, the state is switched from a state in which the switching element 33*v* on the high voltage side in the V phase is on to a state in which the switching element 34*v* on the low voltage side is on. Thereafter, at a timing when the above-mentioned count value reaches CntU, the state is switched from a state in which the switching element 33*u* on the high voltage side in the U phase is on to a state in which the switching element 34*u* on the low voltage side is on. After the carrier signal reaches the highest level, the above-mentioned count value is counted down, and a reversed switching operation is performed.

In a case where the carrier signal of the triangular wave illustrated in FIG. 4 is used, the count loops back from the counting-up to the counting-down at a timing when the process reaches the half of the carrier cycle. The counting-up and the counting-down described above are performed in synchronism with a predetermined clock.

Pulse widths (and duties) of the PWM pulses with respect to the respective phases are generated by the count setting values CntU, CntV, and CntW equivalent to the voltage commands Vu_ref', Vv_ref', and Vw_ref' in the U phase, the V phase, and the W phase.

Figure 6A:
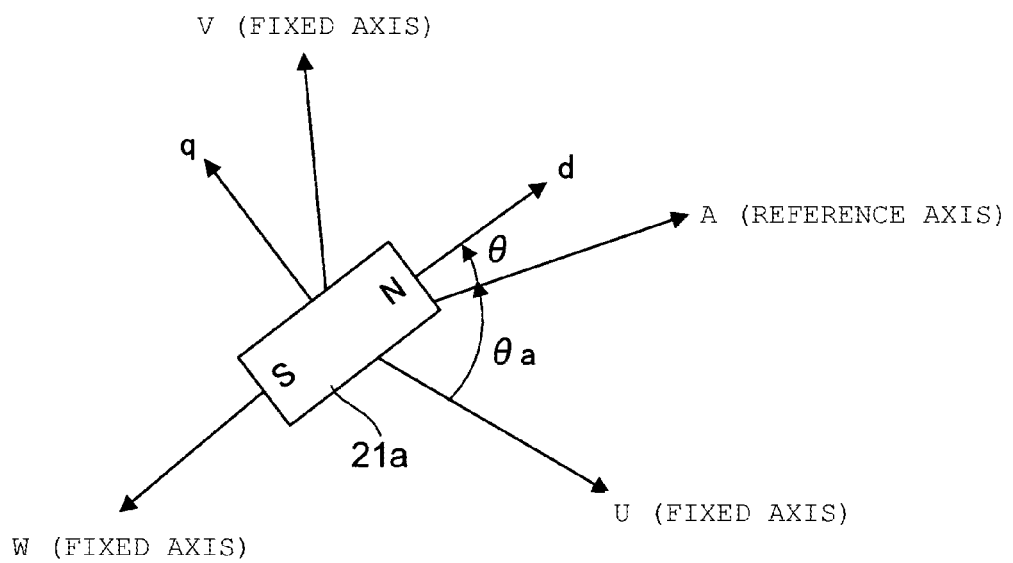
FIG. 6A is an explanatory diagram illustrating an analytic model of the above-mentioned motor in a case where θ is set as a phase of a d axis with respect to a reference axis A.
Figure 6B:
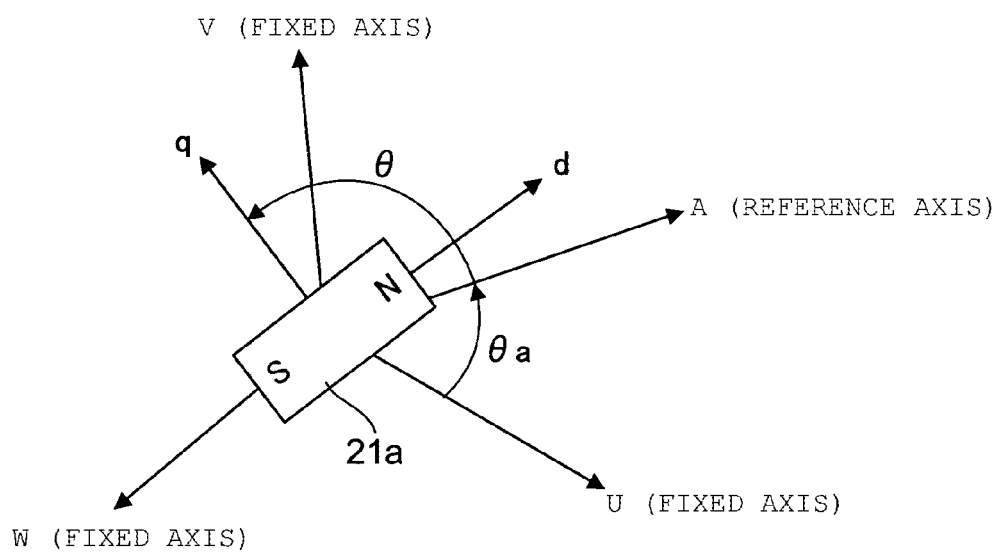
FIG. 6B is an explanatory diagram illustrating the analytic model of the above-mentioned motor in a case where θ is set as a phase of a q axis with respect to the reference axis A.

Next, before the detail of the motor drive control device 4 described above will be described, various definitions are set as follows. FIG. 6A and FIG. 6B are explanatory diagrams illustrating an analytic model of the motor 2. A U-phase axis, a V-phase axis, and a W-phase axis are fixed axes and are mutually shifted in the electric angles by 120° each. A permanent magnet 21*a* is arranged in the rotor 21 of the motor 2. In a rotational coordinate system that rotates at the same speed as magnetic flux created by the permanent magnet 21*a*, a d axis is taken as a direction of the magnetic flux created by the permanent magnet 21*a*, and a q axis is taken as a phase with a lead of 90° in the electric angle from the d axis. A coordinate system having the d axis and the q axis is referred to as a dq coordinate system, and coordinates in which the d axis and the q axis are chosen as coordinate axes are referred to as dq coordinates. The dq coordinate system is a coordinate system in synchronism with the rotor 21 of the motor 2.

In the dq coordinates at an arbitrary moment of the rotating d axis and q axis, a phase of the d axis or the q axis with respect to a certain reference axis A (fixed axis) is represented by θ (electric angle phase). According to the present embodiment, a certain reference axis A is set as the U-phase axis, and the phase of the q axis with respect to the U-phase axis is represented by θ (electric angle phase). That is, the reference axis A corresponds to the electric angle phase 0° when the electric angle phase of the rotor 21 is represented in a range between −180° and +180°, for example. It should be noted that, when a shift in the electric angles between the U-phase axis and the reference axis A is set as θa, the shift θa is determined by the motor drive system 1 and is 0° in the electric angle according to the present embodiment, for example. Information of the shift θa may be stored, for example, in a memory which is not illustrated in the drawing in the motor drive control device 4.

An entire motor voltage applied from the PWM inverter 3 to the motor 2 is represented by Va, and an entire motor current supplied from the PWM inverter 3 to the motor 2 is represented by Ia. A d-axis component and a q-axis component of the motor voltage Va are respectively represented by a d-axis voltage vd and a q-axis voltage vq, and a d-axis component and a q-axis component of the motor current Ia are respectively represented by a d-axis current id and a q-axis current iq.

In addition, command values (voltage command values) with respect to a d-axis voltage vd and a q-axis voltage vq are respectively represented by a d-axis voltage command vd_ref and a q-axis voltage command vq_ref. The d-axis voltage command vd_ref and the q-axis voltage command vq_ref respectively represent voltages (voltage values) to be followed by the d-axis voltage vd and the q-axis voltage vq and are calculated in the motor drive system 1.

Furthermore, command values (current command values) with respect to the d-axis current id and the q-axis current iq are respectively represented by a d-axis current command id_ref and a q-axis current command iq_ref. The d-axis current command id_ref and the q-axis current command iq_ref respectively represent currents (current values) to be followed by the d-axis current id and the q-axis current iq and are calculated in the motor drive system 1.

The motor drive control device 4 will be described in accordance with the above-mentioned definitions. The motor drive control device 4 illustrated in FIG. 1 is a control portion that drives and controls the motor 2 by using the PWM inverter 3 and is provided with a position detection portion 41, a current controller 42, a coordinate converter 43, and the dead time compensation portion 44. The motor drive control device 4 described above is constituted by a microcomputer including a central processing unit (CPU) or the like, for example.

The position detection portion 41 detects the electric angle phase θ of the rotor 21 on the basis of the output signal from the position sensor 6 described above. The information of the detected electric angle phase θ is output from the position detection portion 41 to the coordinate converter 43 and the dead time compensation portion 44 as positional information of the rotor 21.

The current controller 42 converts the input d-axis current command id_ref and q-axis current command iq_ref into the d-axis voltage command vd_ref and the q-axis voltage command vq_ref to be output to the coordinate converter 43.

The coordinate converter 43 respectively converts the d-axis voltage command vd_ref and the q-axis voltage command vq_ref input from the current controller 42 into voltage commands Vu_ref, Vv_ref, and Vw_ref in the U phase, the V phase, and the W phase to be output to the dead time compensation portion 44. The information of the electric angle phase θ of the rotor 21 is input from the position detection portion 41 to the coordinate converter 43, and also, the shift θa in the electric angles between the U-phase axis and the reference axis A is previously found. Therefore, from the relationships illustrated in FIG. 6A and FIG. 6B, the coordinate converter 43 performs coordinate conversions of respective voltage commands in a d-axis direction and a q-axis direction (voltage commands in the two phases) into respective directions of the U-phase axis, the V-phase axis, and the W-phase axis by using the electric angle phase θ of the rotor 21 and the shift θa, and it is possible to obtain respective voltage commands (voltage commands in the three phases) in the U phase, the V phase, and the W phase.

The dead time compensation portion 44 obtains a compensation amount ΔVd for compensating the error of the output voltage of the PWM inverter 3 which is generated when the dead time for avoiding the simultaneous turning-on of the respective switching elements which are connected in series to each other in the PWM inverter 3 is prepared, and outputs voltage commands obtained by taking the compensation amount ΔVd into account to the PWM inverter 3. That is, the dead time compensation portion 44 adds or subtracts the compensation amount ΔVd with respect to the voltage commands Vu_ref, Vv_ref, and Vw_ref in the U phase, the V phase, and the W phase input from the coordinate converter 43 to respectively generate voltage commands Vu_ref', Vv_ref', and Vw_ref' obtained by taking into account the compensation amounts ΔVd in the respective phases to be output to the PWM inverter 3. It should be noted that the compensation of the above-mentioned error of the output voltage generated when the dead time is prepared, that is, the generation of the voltage commands Vu_ref', Vv_ref', and Vw_ref' obtained by taking into account the compensation amounts ΔVd in the respective phases is also referred to as dead time compensation.

Figure 7:
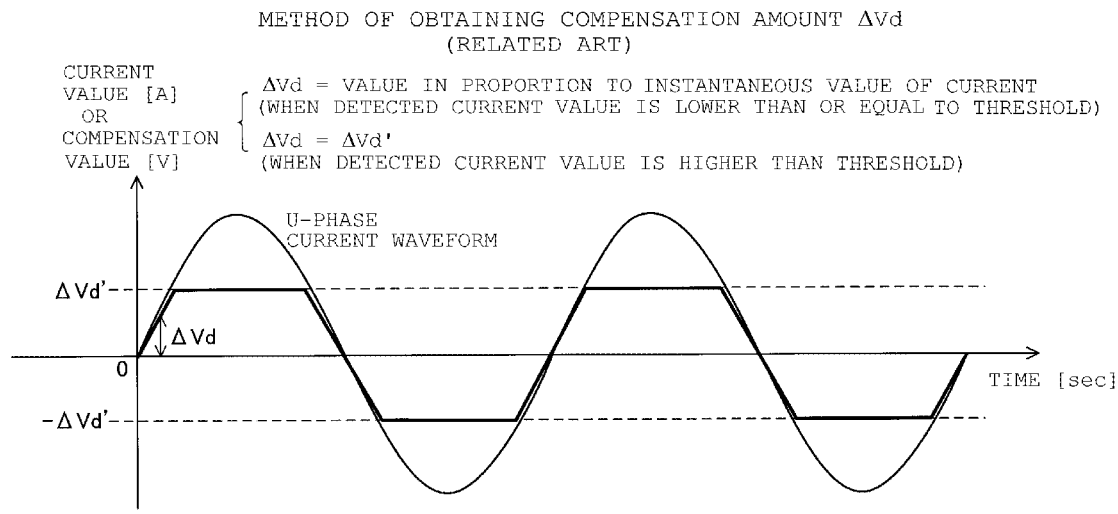
FIG. 7 is an explanatory diagram illustrating an example of a general related-art method of obtaining a dead time compensation amount.

Herein, FIG. 7 is an explanatory diagram illustrating a general related-art method of obtaining the compensation amount ΔVd. For example, in a case where the compensation amount ΔVd with regard to the U phase is considered, up to now, an instantaneous value (momentary value) of the U-phase current is detected, and when the detected current is lower than or equal to a threshold, the compensation amount ΔVd is determined in proportion to the detected current value. Then, the obtained compensation amount ΔVd is added or subtracted with respect to the voltage command in the U phase, and the voltage command obtained by taking the compensation amount ΔVd into account is generated. On the other hand, in a case where the detected current exceeds the threshold, the compensation amount ΔVd is uniformly set as a fixed value ΔVd'. In the above-mentioned dead time compensation, since the phase current (the U-phase current in the above-mentioned example) is to be detected, the dead time compensation is not easily performed. It should be noted that the manner for setting the above-mentioned compensation amount ΔVd is also described in the above-mentioned Japanese Laid-open Patent Application Publication No. 2011-55608 (see FIG. 8 in Japanese Laid-open Patent Application Publication No. 2011-55608).

Figure 8:
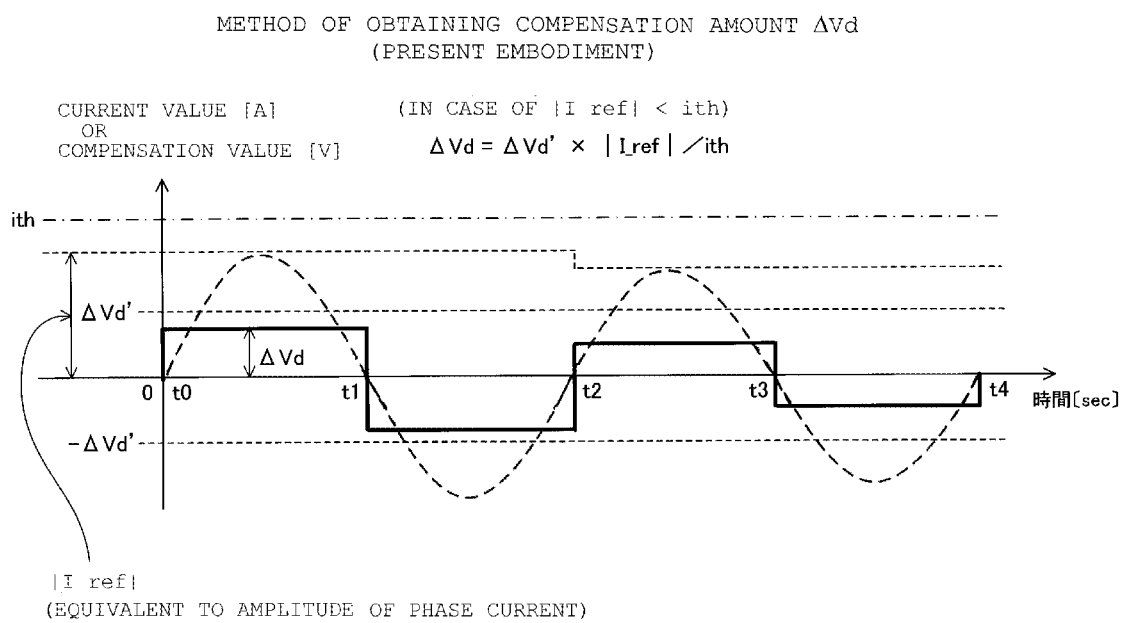
FIG. 8 is an explanatory diagram illustrating a method of obtaining a compensation amount according to an exemplary embodiment of the present disclosure.

On the other hand, FIG. 8 is an explanatory diagram illustrating the method of obtaining the compensation amount ΔVd according to the present embodiment. According to the present embodiment, the dead time compensation portion 44 obtains the compensation amount ΔVd on the basis of a magnitude of a current command vector I_ref indicating a vector of a current to be followed by the current flowing through the motor 2. With this configuration, it is possible to easily perform the dead time compensation without detecting the above-mentioned phase current. Hereinafter, a detail of the dead time compensation according to the present embodiment will be further described. It should be noted that a case where the compensation amount ΔVd is obtained with regard to one of the U phase, the V phase, and the W phase (for example, the U phase) will be described as an example below, but the compensation amount ΔVd can also be obtained with regard to the other phases by using the similar method.

Figure 9:
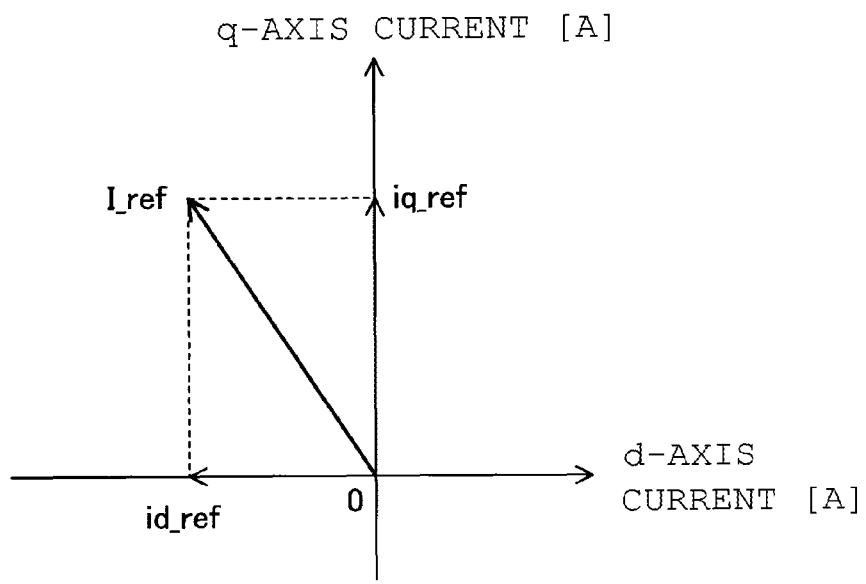
FIG. 9 is an explanatory diagram schematically illustrating a current command vector.

FIG. 9 schematically illustrates the current command vector I_ref. The current command vector I_ref is a resultant vector of the respective vector components of the d-axis current command id_ref and the q-axis current command iq_ref described above. When a magnitude of the current command vector I_ref is set as |I_ref|, |I_ref| is represented by the following Expression (1).

$$|I\_ref| = \sqrt{\{(id\_ref)^2 + (iq\_ref)^2\}} \quad (1)$$

Figure 10:
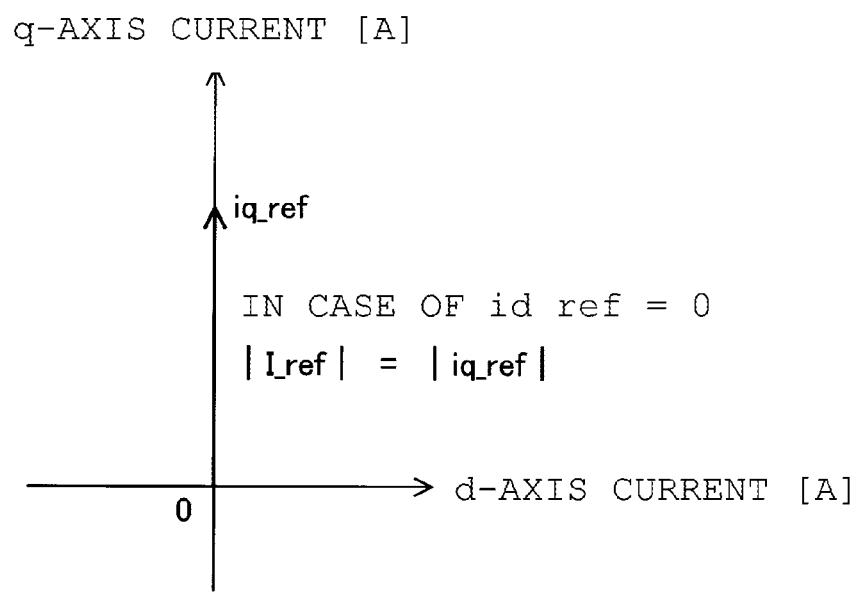
FIG. 10 is an explanatory diagram illustrating the current command vector when a d-axis current command is set as 0 [A].

Herein, to further simplify the calculation, as illustrated in FIG. 10, the d-axis current command id_ref is considered as 0 [A]. That is, the dead time compensation portion obtains the compensation amount ΔVd on the basis of the magnitude of the current command vector I_ref when the d-axis current command id_ref is set as 0 [A]. In this case, the magnitude of the current command vector I_ref (|I_ref|) is presented by the following Expression (2) and becomes the magnitude of the q-axis current command iq_ref itself.

$$|I\_ref| = |iq\_ref| \quad (2)$$

Specifically, according to the present embodiment, the compensation amount ΔVd is obtained as follows by using |I_ref| (=|iq_ref|). In FIG. 8, the current waveform equivalent to the phase current (for example, the U-phase current) is indicated by a broken line sine wave. It should be noted that, according to the present embodiment, a reason why the current waveform is indicated by the broken line is that the phase current is not detected as being different from the case of FIG. 7. The above-mentioned |I_ref| (=|iq_ref|) is equivalent to an amplitude of a current waveform of the phase current in FIG. 8. In view of the above, according to the present embodiment, when a previously determined fixed value of the compensation amount is set as ΔVd', a q-axis current command is set as iq_ref(t) [A] while a time t is set as a variable, and a current threshold is set as ith [A], the dead time compensation portion 44 determines ΔVd obtained by the calculation of the following Expression (3) as the compensation amount. It should be noted however that |I_ref| (=|iq_ref|) is set to be lower than the current threshold ith.

$$\Delta Vd = \Delta Vd' \times |iq\_ref(t)|/ith \quad (3)$$

It should be noted that, as illustrated in FIG. 8, the polarity of the compensation amount ΔVd becomes positive in a period during which the polarity of the phase current is positive (for example, a period from t0 to t1 and a period from t2 to t3) and becomes negative in a period during which the polarity of the phase current becomes negative (for example, a period from t1 to t2 and a period from t3 to t4). The above-mentioned polarity of the compensation amount ΔVd is obtained by a method which will be described below, and herein, a magnitude (absolute value) of the compensation amount ΔVd is obtained in advance by Expression (3).

It should be noted that the compensation amount ΔVd (absolute value) takes a constant value in accordance with Expression (3) in a period during which the value of |I_ref| equivalent to an amplitude of the phase current is constant (in FIG. 8, a period from t0 to t2 and a period from t2 to t4). In a case where |I_ref| is lower than the current threshold ith, for example, in the period from t2 to t4 during which |I_ref| becomes lower than the value in the period from t0 to t2, the compensation amount ΔVd becomes lower than the value in the period from t0 to t2. On the other hand, in a period during which |I_ref| becomes higher than the value in the period from t0 to t2, the compensation amount ΔVd becomes higher than the value in the period from t0 to t2.

Figure 11:
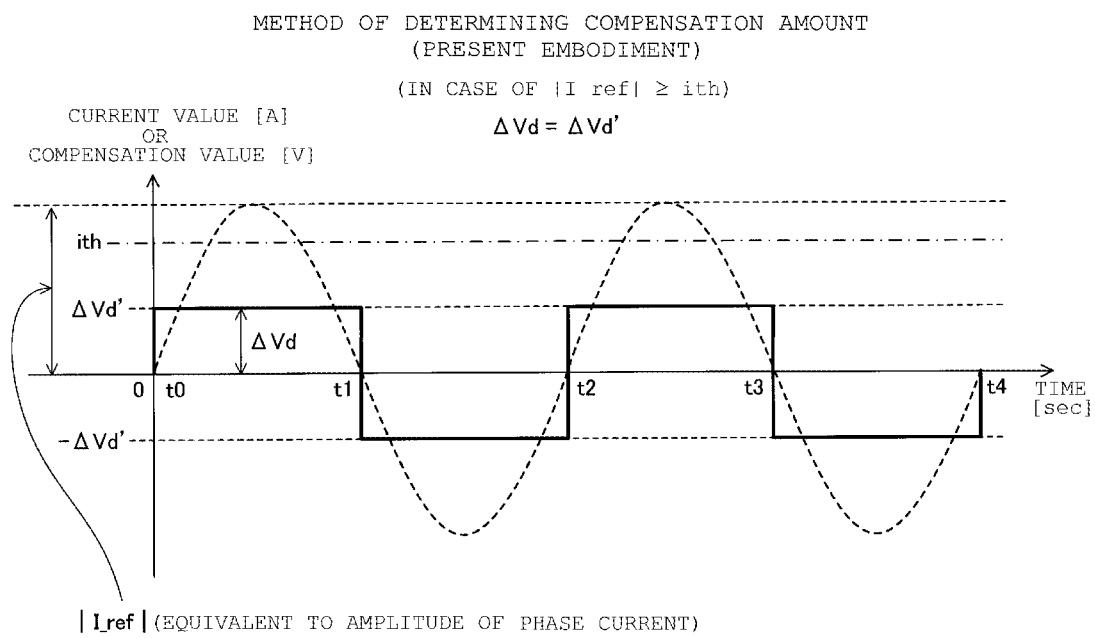
FIG. 11 is an explanatory diagram illustrating the compensation amount in a case where a magnitude of the current command vector is higher than or equal to a current threshold.

FIG. 11 is an explanatory diagram illustrating the compensation amount ΔVd in a case where |I_ref| (=|iq_ref|) is higher than or equal to the current threshold ith. In a case where the absolute value |iq_ref(t)| of the q-axis current command is higher than or equal to the current threshold ith, the dead time compensation portion 44 determines the fixed value ΔVd' as the compensation amount ΔVd. That is, the current threshold ith is used instead of the absolute value |iq_ref(t)| of the q-axis current command in Expression (3). As a result, ΔVd=ΔVd' is established from Expression (3). Therefore, the compensation amount ΔVd does not exceed the fixed value ΔVd' even when |I_ref| (=|iq_ref|) is increased and exceeds the current threshold ith.

As described above, according to the present embodiment, since the dead time compensation portion 44 obtains the compensation amount ΔVd on the basis of the current command vector I_ref corresponding to the resultant vector of the d-axis current command id_ref and the q-axis current command iq_ref, the detection of the phase current which is needed at the time of the dead time compensation in the related art becomes unnecessary. Furthermore, according to Japanese Laid-open Patent Application Publication No. 9-261974 described above, when the dead time compensation is performed, the complicated coordinate conversion processing for converting the current commands in the two phases (for example, the respective current commands on the d axis and the q axis) into current commands in the three phases (for example, the respective current commands in the U phase, the V phase, the W phase) is needed, but according to the configuration of the present embodiment, the above-mentioned coordinate conversion processing from the current commands in the two phases into the current commands in the three phases also becomes unnecessary. Therefore, according to the configuration of the present embodiment, it is possible to easily perform the dead time compensation by easily obtaining the compensation amount ΔVd without performing the detection of the phase current and the complicated coordinate conversion processing of the current commands.

The dead time compensation portion 44 obtains the compensation amount ΔVd on the basis of the magnitude of the current command vector I_ref when the d-axis current command id_ref is set as 0 [A]. In this case, since the magnitude of the current command vector I_ref becomes the magnitude of the q-axis current command iq_ref itself from Expression (2), the dead time compensation portion 44 can calculate the compensation amount ΔVd on the basis of the q-axis current command iq_ref alone. Therefore, as compared with the case where the compensation amount ΔVd is calculated by using both the d-axis current command id_ref and the q-axis current command iq_ref, the calculation of the compensation amount ΔVd becomes further facilitated, and it is possible to easily obtain the compensation amount ΔVd.

The dead time compensation portion 44 determines ΔVd obtained by the calculation of the above-mentioned Expression (3) as the compensation amount when the d-axis current command id_ref is set as 0 [A]. The fixed value ΔVd' and the current threshold ith are previously determined and can be treated as constants at the time of the calculation. The q-axis current command iq_ref(t) also exists as control information. Therefore, the dead time compensation portion 44 can perform the dead time compensation by obtaining the compensation amount ΔVd in proportion to the absolute value

|iq_ref(t)| of the q-axis current command without performing the complicated processing.

Since the dead time compensation portion 44 calculates the compensation amount ΔVd by using the absolute value of the q-axis current command |iq_ref(t)|, it is possible to obtain the compensation amount ΔVd (absolute value) without taking the polarity into account. Although the polarity of the compensation amount ΔVd differs for each phase (for example, for each of the U phase, the V phase, and the W phase), the dead time compensation can be performed by separately obtaining the above-mentioned polarity by a method which will be described below on the basis of the obtained polarity and the above-mentioned compensation amount ΔVd (absolute value).

In a case where the absolute value |iq_ref(t)| of the q-axis current command is higher than or equal to the current threshold ith, the dead time compensation portion 44 determines the fixed value ΔVd' as the compensation amount ΔVd. In a case where the absolute value |iq_ref(t)| of the q-axis current command is lower than the current threshold ith, ΔVd<ΔVd' is established from Expression (3). On the other hand, in a case where the absolute value |iq_ref(t)| of the q-axis current command is higher than or equal to the current threshold ith, ΔVd=ΔVd' is established since the dead time compensation portion 44 sets the fixed value ΔVd' as the compensation amount ΔVd. Therefore, the relationship of ΔVd≤ΔVd' is regularly maintained. That is, it is possible to set the compensation amount ΔVd in a range without exceeding the upper limit (ΔVd').

The resultant vector of the respective components of the d-axis current command id_ref and the q-axis current command iq_ref by the vector defined by the dq coordinate system has been considered as the current command vector above. However, it is sufficient when the current command vector is a vector defined by a coordinate system in synchronism with the rotor 21 or its equivalent coordinate system, and the configuration is not limited to the vector defined by the dq coordinate system including the d axis and the q axis.

Next, the dead time compensation according to the present embodiment will be described also with regard to a method of determining whether to add or subtract the compensation amount ΔVd obtained by the above-mentioned method with respect to the voltage command before the compensation. It should be noted that, herein, the electric angle phase of the rotor 21 θ is set in the range between −180° and +180°, and the reference of the electric angle phase θ is set as 0° as described above. A rotation direction of the rotor 21 in which the value of the electric angle phase θ is increased (from 0° towards +180°) is set as positive, and a rotation direction of the rotor 21 in which the value of the electric angle phase θ is decreased (from 0° towards −180°) is set as negative. A state corresponding to a rotation speed≥0 indicates that the rotor 21 rotates in the positive direction or is in a stopped state, and a state corresponding to the rotation speed<0 indicates that the rotor 21 rotates in the negative direction (direction opposite to the positive direction).

Figure 12:
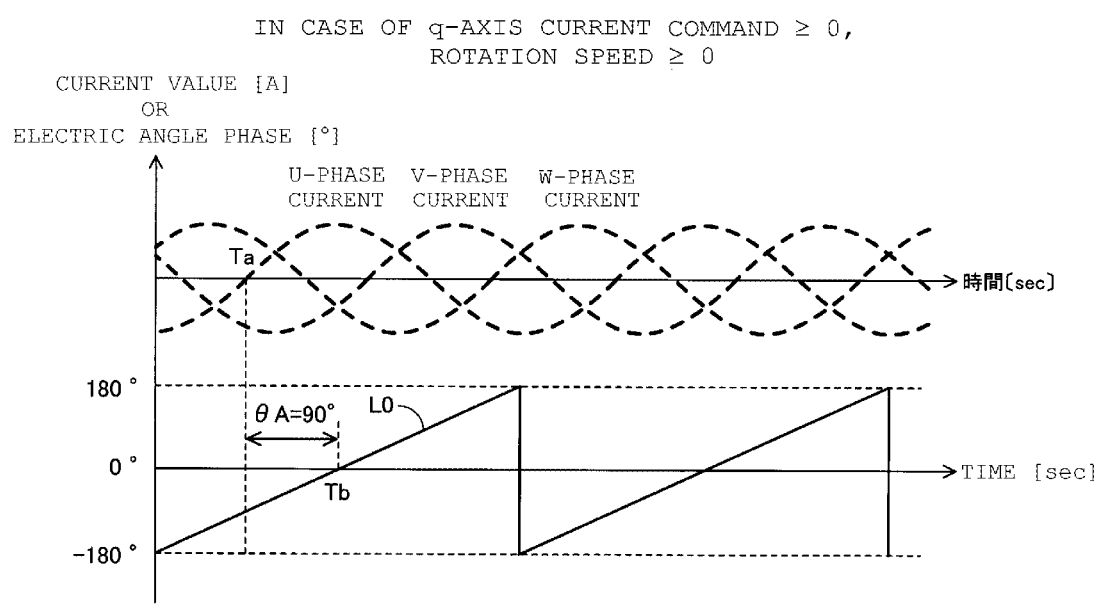
FIG. 12 is an explanatory diagram illustrating waveforms of respective phase currents and a change of an electric angle phase of a rotor of the above-mentioned motor with respect to a time elapse.

First, a case where the q-axis current command iq_ref≥0 and the rotation speed≥0 (positive torque) are set (corresponding to a condition 1) will be described as an example. Under the condition 1, respective waveforms of the U-phase current, the V-phase current, and the W-phase current and changes with respect to time elapse of the electric angle phase of the rotor 21 are illustrated in FIG. 12. It should be noted that, since the U-phase current, the V-phase current, and the W-phase current are not actually detected, the current waveforms in the respective phases are indicated by broken lines in FIG. 12. The phases of the U-phase current, the V-phase current, and the W-phase current are shifted in 120° each by the electric angles.

Herein, the U phase is set as a first phase of the motor 2, the V phase is set as a second phase, and the W phase is set as a third phase. A phase difference in the electric angles between a timing Ta at which the U-phase current (which is however not obtained according to the present embodiment) becomes 0 [A] and a timing Tb at which the electric angle phase of the rotor 21 becomes 0° is set as an initial phase difference θA. According to the present embodiment, the initial phase difference θA is set as 90°. The initial phase difference θA at 90° is previously determined by the system.

Figure 13:
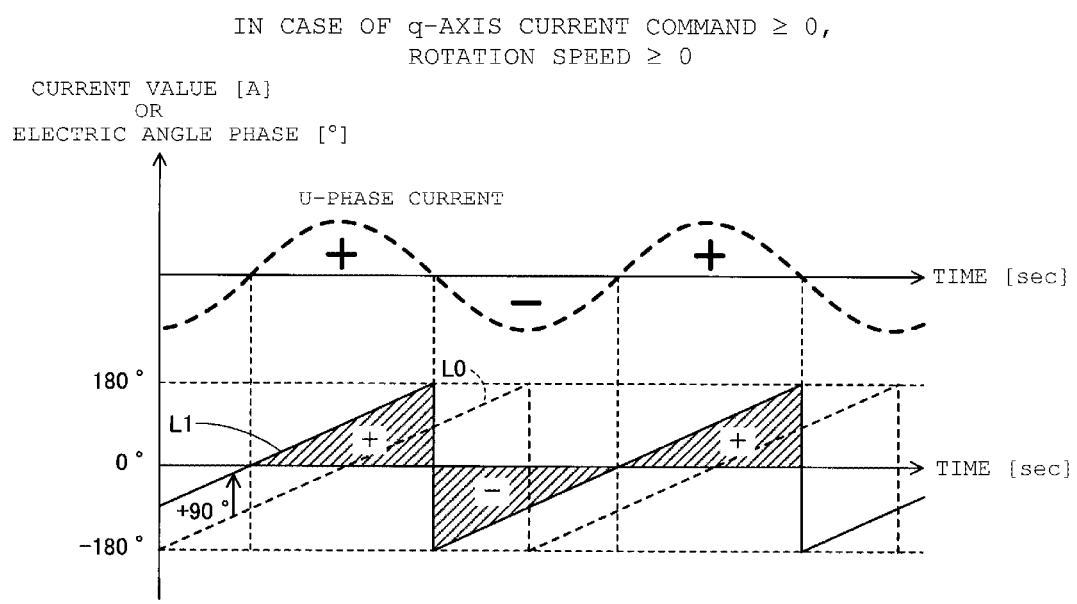
FIG. 13 is an explanatory diagram schematically illustrating a method of determining a polarity of the compensation value with regard to a U phase by using a value of the electric angle phase of the above-mentioned rotor.

In FIG. 12, the electric angle phase θ of the rotor 21 linearly changes with respect to the time elapse, and this change cyclically repeats. A line indicating a change of the electric angle phase θ illustrated in FIG. 12 is set as L0. As illustrated in FIG. 13, a line obtained by shifting the line L0 by an amount equivalent to the initial phase difference θA (90°) in the direction in which the electric angle phase θ is increased is set as L1. From FIG. 13, on the line L1, it is understood that a period during which the value of the electric angle phase θ is higher than 0° (period during which the value of the electric angle phase θ becomes positive) is matched with a period during which the polarity of the U-phase current becomes positive, and a period during which the value of the electric angle phase θ is lower than 0° (period during which the value of the electric angle phase θ becomes negative) is matched with a period during which the polarity of the U-phase current becomes negative. Therefore, when the line L1 is used, it becomes possible to estimate the polarity of the U-phase current from the value of the electric angle phase θ (polarity) indicated by the line L1 even when the phase current is not actually detected. In view of the above, according to the present embodiment, the dead time compensation is performed on the basis of the line L1 as follows.

The dead time compensation portion 44 obtains the polarity of the compensation amount ΔVd on the basis of the q-axis current command iq_ref and the electric angle phase θ of the rotor 21 detected in the position detection portion 41 to accordingly perform the dead time compensation with regard to the U phase. More specifically, the dead time compensation portion 44 adds or subtracts the initial phase difference θA (herein, adds 90°) with respect to the value of the electric angle phase θ of the rotor 21 obtained by the position detection portion 41 to shift the value of the electric angle phase θ. In a case where the shifted value of the electric angle phase θ is positive, the dead time compensation portion 44 adds a value obtained by multiplying the compensation amount ΔVd with the polarity of the q-axis current command iq_ref to the voltage command Vu_ref in the first phase (the U phase) which is input to the dead time compensation portion 44 to be output. On the other hand, in a case where the shifted value of the electric angle phase θ is negative, the dead time compensation portion 44 subtracts the value obtained by multiplying the compensation amount ΔVd with the polarity of the q-axis current command iq_ref from the voltage command Vu_ref in the first phase (the U phase) to be output.

As a result of the above-mentioned calculation in the dead time compensation portion 44, the voltage command Vu_ref' after the compensation with regard to the U phase is represented as follows:

in a case where the value of the electric angle phase θ after the shift is positive, $$Vu\_ref'=Vu\_ref+\Delta Vd \times (\text{polarity of the } q\text{-axis current command } iq\_ref) \qquad (8a),\text{ and}$$

in a case where the value of the electric angle phase θ after the shift is negative, $$Vu\_ref'=Vu\_ref-\Delta Vd \times (\text{polarity of the } q\text{-axis current command } iq\_ref) \qquad (8b).$$

Under the condition 1, the voltage command Vu_ref' after the compensation is represented as follows since the polarity of the q-axis current command iq_ref is positive from Expression (8a) and Expression (8b). That is, the voltage command Vu_ref' after the compensation is represented as follows:

in a case where the value of the electric angle phase θ after the shift is positive, $$Vu\_ref'=Vu\_ref+\Delta Vd \qquad (9a),\text{ and}$$

in a case where the value of the electric angle phase θ after the shift is negative, $$Vu\_ref'=Vu\_ref-\Delta Vd \qquad (9b).$$

Since the polarity of the compensation amount ΔVd is positive in Expression (9a), it means that the addition processing of the compensation amount ΔVd is performed with respect to the voltage command Vu_ref before the compensation. On the other hand, since the polarity of the compensation amount ΔVd is negative in Expression (9b), it means that the subtraction processing of the compensation amount ΔVd is performed with respect to the voltage command Vu_ref before the compensation.

A case of the q-axis current command iq_ref<0 and the rotation speed≥0 (positive torque) is set as a condition 2. Under the condition 2, a relationship between the addition processing and the subtraction processing of the compensation amount ΔVd is reversed from the case of the condition 1 due to the negative polarity of the q-axis current command iq_ref.

That is, under the condition 2, the voltage command Vu_ref' after the compensation is represented as follows since the polarity of the q-axis current command iq_ref is negative from Expression (8a) and Expression (8b). That is, in a case where the value of the electric angle phase θ after the shift is positive, the voltage command Vu_ref' after the compensation is represented as follows.

$$Vu\_ref'=Vu\_ref-\Delta Vd \qquad (10a)$$

That is, in the second term on the right side of Expression (8a), as a result of the multiplication of +ΔVd and the negative polarity of the q-axis current, the polarity of the compensation amount ΔVd becomes negative, and the subtraction processing of the compensation amount ΔVd is performed in total. On the other hand, in a case where the value of the electric angle phase θ after the shift is negative, the voltage command Vu_ref' after the compensation is represented as follows.

$$Vu\_ref'=Vu\_ref+\Delta Vd \qquad (10b)$$

That is, in the second term on the right side of Expression (8b), as a result of the multiplication of −ΔVd and the negative polarity of the q-axis current, the polarity of the compensation amount ΔVd becomes positive, and the addition processing of the compensation amount ΔVd is performed in total.

As described above, the relationship between the addition processing and the subtraction processing of the compensation amount ΔVd in total is reversed under the condition 1 and the condition 2. However, it may be mentioned that the following aspect is common under the condition 1 and the condition 2 that the value obtained by multiplying the compensation amount ΔVd with the polarity of the q-axis current command iq_ref is added to the voltage command Vu_ref in a case where the shifted value of the electric angle phase θ is positive, and the value obtained by multiplying the compensation amount ΔVd with the polarity of the q-axis current command iq_ref is subtracted from the voltage command Vu_ref in a case where the shifted value of the electric angle phase θ is negative.

As described above, according to the present embodiment, the dead time compensation portion 44 obtains the polarity of the compensation amount ΔVd (whether to add or subtract ΔVd) on the basis of the q-axis current command iq_ref (in particular, the polarity) and the electric angle phase θ of the rotor 21 which is detected in the position detection portion 41. With this configuration, it is possible to perform the dead time compensation by taking the above-mentioned polarity into account for the previously obtained compensation amount ΔVd (absolute value) of the dead time to correct the voltage command (adding or subtracting the compensation amount with respect to the voltage command) without performing the detection of the phase current which is needed at the time of the dead time compensation as in the related art and the complicated coordinate conversion processing for converting the current commands in the two phases into the current commands in the three phases.

When the dead time compensation is to be performed, basically, for each phase of the U phase, the V phase, and the W phase, the addition processing of the compensation amount ΔVd is performed with respect to the voltage command before the compensation in the case of the phase current≥0, and the subtraction processing of the compensation amount ΔVd is performed with respect to the voltage command before the compensation in the case of the phase current<0. According to the present embodiment, since the phase current is not detected, the polarity of the phase current is not directly obtained. However, it is possible to estimate the polarity of the U-phase current from the polarity of the electric angle phase θ indicated by the line L1 and the polarity of the q-axis current command iq_ref on the basis of the relationship between the line L1 (the electric angle phase θ after the shift) and the waveform of the U-phase current illustrated in FIG. 13 even when the U-phase current is not actually detected. With this configuration, it is possible to easily determine whether to add or subtract the compensation amount ΔVd with respect to the voltage command before the compensation.

Therefore, as described above, the dead time compensation portion 44 obtains the polarity of the compensation amount ΔVd (whether to perform addition or subtraction) on the basis of the value of the electric angle phase θ (value of the electric angle phase θ after the 90° shift) which is indicated by the line L1 and the q-axis current command iq_ref (in particular, the polarity) and performs the addition or subtraction of the compensation amount ΔVd to calculate the voltage command Vu_ref' after the compensation. Thus, it is possible to easily obtain the voltage command Vu_ref' after the compensation in which the compensation amount ΔVd is taken into account with regard to the U phase without performing the detection of the U phase current and the complicated coordinate conversion processing from the current commands in the two phases to the current commands in the three phases as in the related art. With this configuration, it is possible to easily perform the dead time compensation with regard to the U phase.

It should be noted that, since the timing Tb is later than the timing Ta in terms of time in the example of FIG. 12, as illustrated in FIG. 13, the initial phase difference θA is added (herein, 90° is added) to the value of the electric angle phase θ of the rotor 21 which is obtained by the position detection portion 41 to shift the value of the electric angle phase θ. For example, in a case where the timing Tb is earlier than the timing Ta in terms of time, when the initial phase difference θA is subtracted from the value of the electric angle phase θ of the rotor 21 which is obtained by the position detection portion 41 to shift the value of the electric angle phase θ, it is possible to obtain the line L1 similar to FIG. 13. Therefore, in this case too, the dead time compensation portion 44 can perform the dead time compensation by adding or subtracting the value obtained by multiplying the compensation amount ΔVd with the polarity of the q-axis current command iq_ref with respect to the voltage command Vu_ref before the compensation on the basis of the value of the electric angle phase θ after the shift.

Figure 14:
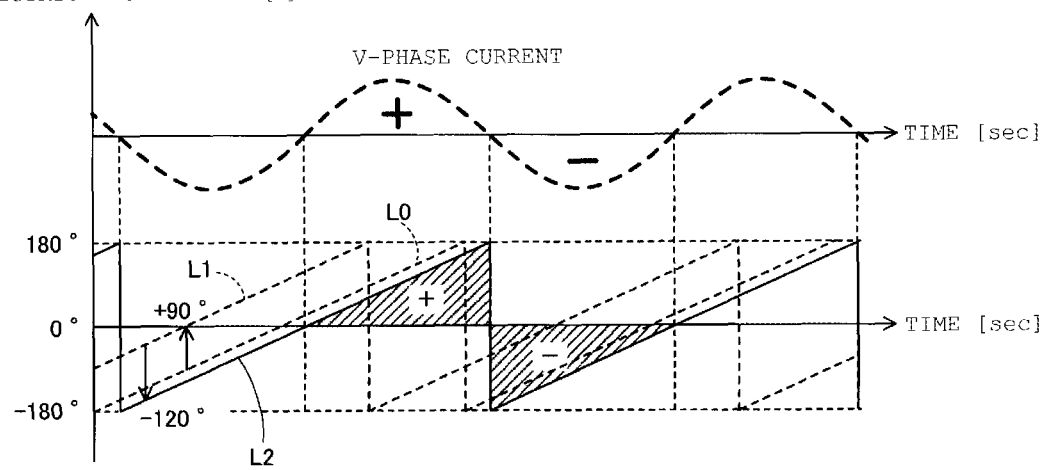
FIG. 14 is an explanatory diagram schematically illustrating a method of determining a polarity of the compensation value with regard to a V phase by using the value of the electric angle phase of the above-mentioned rotor.

FIG. 14 is an explanatory diagram illustrating both a waveform of the V-phase current under the condition 1 and the change with respect to the time elapse of the electric angle phase θ of the rotor 21. It should be noted however that the q-axis current command iq_ref≥0 and the rotation speed of the rotor 21≥0 (positive torque) are set. Since the phase of the V-phase current is delayed with respect to the phase of the U-phase current by 120° in the electric angles, as illustrated in FIG. 14, the line L1 is shifted in a direction in which the electric angle phase θ is decreased by an amount equivalent to 120° in the electric angle. The line after the shift is set as L2.

It is understood from FIG. 14 that, on the line L2, a period during which the value of the electric angle phase θ is higher than 0° (period during which the value of the electric angle phase θ becomes positive) is matched with a period during which the polarity of the V-phase current becomes positive, and a period during which the value of the electric angle phase θ is lower than 0° (period during which the value of the electric angle phase θ becomes negative) is matched with a period during which the polarity of the V-phase current becomes negative. Therefore, when the line L2 is used, it is possible to estimate the polarity of the V-phase current from the value of the electric angle phase θ (polarity) which is indicated by the line L2 even when the phase current is not actually detected. In view of the above, the dead time compensation is performed with regard to the V phase on the basis of the line L2 as follows.

That is, when the addition or subtraction of the compensation amount ΔVd is performed with respect to the voltage command Vv_ref in the second phase (the V phase) with a delay of 120° in the electric angle with respect to the first phase (the U phase) of the motor 2, the dead time compensation portion 44 further subtracts 120° from the value of the shifted electric angle phase θ (equivalent to the line L1) described above. In a case where the value of the electric angle phase θ after the 120° subtraction is positive, the value obtained by multiplying the compensation amount ΔVd with the polarity of the q-axis current command iq_ref is added to the voltage command Vv_ref in the second phase (the V phase) input to the dead time compensation portion 44 to be output. On the other hand, in a case where the value of the electric angle phase θ after the 120° subtraction is negative, the value obtained by multiplying the compensation amount ΔVd with the polarity of the q-axis current command iq_ref is subtracted from the voltage command Vv_ref in the second phase (the V phase) to be output.

As a result of the above-mentioned calculation in the dead time compensation portion 44, the voltage command Vv_ref' after the compensation with regard to the V phase is represented as follows:

in a case where the value of the electric angle phase θ after the 120° subtraction is positive, Vv_ref'=Vv_ref+ΔVd×(polarity of the q-axis current command iq_ref), and in a case where the value of the electric angle phase θ after the 120° subtraction is negative, Vv_ref'=Vv_ref−ΔVd×(polarity of the q-axis current command iq_ref).

It should be noted that a point that the relationship between the addition processing and the subtraction processing of the compensation amount ΔVd in the case of the condition 2 (the q-axis current command iq_ref<0, the rotation speed≥0 (positive torque)) becomes the opposite to the case of the condition 1 is the same as the case of the dead time compensation with regard to the U phase.

As described above, in the dead time compensation with regard to the V phase, the dead time compensation portion 44 obtains the polarity of the compensation amount ΔVd (whether to perform addition or subtraction) on the basis of the value of the electric angle phase θ (value of the electric angle phase θ after the 120° subtraction) which is indicated by the line L2 and the q-axis current command iq_ref (in particular, the polarity) to calculate the voltage command Vv_ref' after the compensation. With this configuration, it is possible to easily obtain the voltage command Vv_ref' after the compensation in which the compensation amount ΔVd is taken into account with regard to the V phase without performing the detection of the V phase current and the complicated coordinate conversion processing from the current commands in the two phases to the current commands in the three phases as in the related art. With this configuration, with regard to the V phase, it is possible to easily perform the dead time compensation.

It should be noted that, in the above explanation, when the line L2 is to be obtained, the line L1 is shifted in the direction in which the electric angle phase θ is decreased (by subtracting 120°) to obtain the line L2, but the line L2 is also obtained by the line L0 described above in the direction in which the electric angle phase θ is decreased (by subtracting 30°). Therefore, it can also be mentioned that the following configuration may be adopted. The dead time compensation portion 44 adds or subtracts the initial phase difference θA (herein, adds) 90° with respect to the value of the electric angle phase θ of the rotor 21 which is obtained by the position detection portion 41 and further performs subtraction of 30°. In a case where the value of the electric angle phase θ after the 30° subtraction is positive, the value obtained by multiplying the compensation amount ΔVd with the polarity of the q-axis current command iq_ref is added to the voltage command Vv_ref in the V phase input to the dead time compensation portion 44 to be output. On the other hand, in a case where the value of the electric angle phase θ after the 30° subtraction is negative, the value obtained by multiplying the compensation amount ΔVd with the polarity of the q-axis current command iq_ref is subtracted from the voltage command Vv_ref in the V phase to be output.

Figure 15:
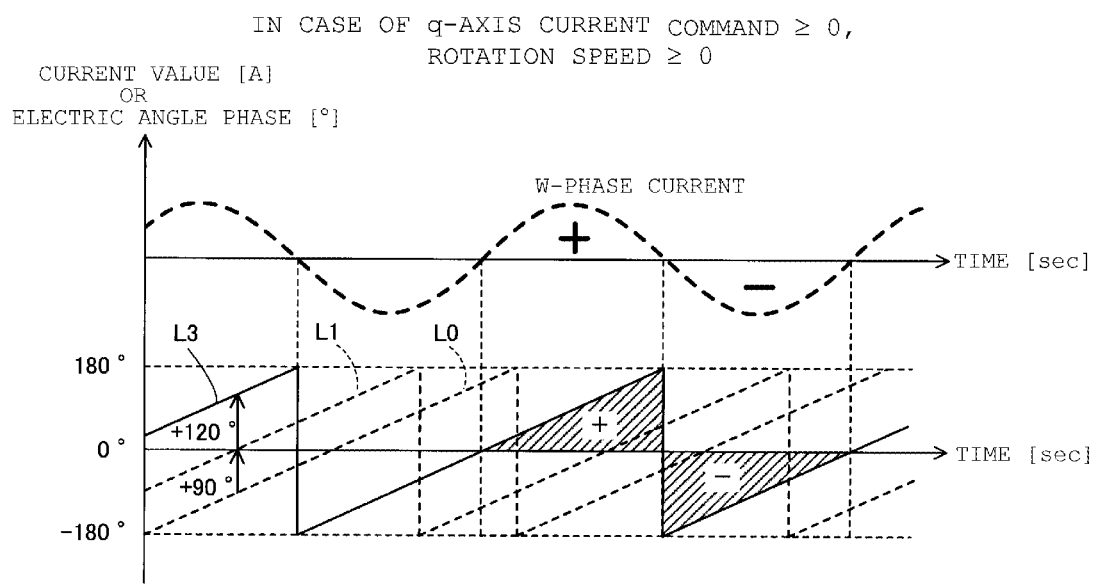
FIG. 15 is an explanatory diagram schematically illustrating a method of determining a polarity of the compensation value with regard to a W phase by using the value of the electric angle phase of the above-mentioned rotor.

FIG. 15 is an explanatory diagram illustrating both a waveform of the W-phase current under the condition 1 and the change with respect to the time elapse of the electric angle phase θ of the rotor 21. It should be noted however that the q-axis current command iq_ref≥0 and the rotation speed of the rotor 21≥0 (positive torque) are set. Since the phase of the W-phase current is in a lead of 120° in the electric angle with respect to the phase of the U-phase current, the line L1 is shifted in the direction in which the electric angle phase θ is increased by an amount equivalent to 120° in the electric angle as illustrated in FIG. 15. The line after the shift is set as L3.

It is understood from FIG. 15 that, on the line L3, a period during which the value of the electric angle phase θ is higher than 0° (period during which the value of the electric angle phase θ becomes positive) is matched with a period during which the polarity of the W-phase current becomes positive, and a period during which the value of the electric angle phase θ is lower than 0° (period during which the value of the electric angle phase θ becomes negative) is matched with a period during which the polarity of the W-phase current becomes negative. Therefore, when the line L3 is used, it becomes possible to estimate the polarity of the W-phase current from the value of the electric angle phase θ (polarity) indicated by the line L3 even when the phase current is not actually detected. In view of the above, the dead time compensation is performed with regard to the W phase on the basis of the line L3 as follows.

That is, when the addition or subtraction of the compensation amount ΔVd is performed with respect to the voltage command Vw_ref in the third phase (the W phase) with a lead of 120° in the electric angle with respect to the first phase (the U phase) of the motor 2, the dead time compensation portion 44 further adds 120° to the value of the shifted electric angle phase (equivalent to the line L1) described above. In a case where the value of the electric angle phase θ after the 120° addition is positive, the value obtained by multiplying the compensation amount ΔVd with the polarity of the q-axis current command iq_ref is added to the voltage command Vw_ref in the third phase (the W phase) which is input to the dead time compensation portion 44 to be output. On the other hand, in a case where the value of the electric angle phase θ after the 120° addition is negative, the value obtained by multiplying the compensation amount ΔVd with the polarity of the q-axis current command iq_ref is subtracted from the voltage command Vw_ref in the third phase (the W phase) to be output.

As a result of the above-mentioned calculation in the dead time compensation portion 44, the voltage command Vw_ref' after the compensation with regard to the W phase is represented as follows:

in a case where the value of the electric angle phase θ after the 120° addition is positive, Vw_ref'=Vw_ref+ΔVd×(polarity of the q-axis current command iq_ref), and in a case where the value of the electric angle phase θ after the 120° addition is negative, Vw_ref'=Vw_ref−ΔVd×(polarity of the q-axis current command iq_ref).

It should be noted that a point that the relationship between the addition processing and the subtraction processing of the compensation amount ΔVd in the case of the condition 2 (the q-axis current command iq_ref<0, the rotation speed≥0 (positive torque)) becomes opposite to the case of the condition 1 is the same as the case of the dead time compensation with regard to the U phase.

As described above, in the W-phase dead time compensation, the dead time compensation portion 44 obtains the polarity of the compensation amount ΔVd (whether to perform addition or subtraction) on the basis of the value of the electric angle phase θ (value of the electric angle phase θ after the 120° addition) indicated by the line L3 and the q-axis current command iq_ref (in particular, the polarity) to calculate the voltage command Vw_ref' after the compensation. With this configuration, it is possible to easily obtain the voltage command Vw_ref' after the compensation in which the compensation amount ΔVd is taken into account with regard to the W phase without performing the detection of the W phase current and the complicated coordinate conversion processing from the current commands in the two phases to the current commands in the three phases as in the related art. With this configuration, it is possible to easily perform the dead time compensation with regard to the W phase.

It should be noted that, in the above explanation, when the line L3 is to be obtained, the line L1 is shifted in the direction in which the electric angle phase θ is increased (by adding 120°) to obtain the line L3. The line L3 is also obtained by shifting the line L0 described above in the direction in which the electric angle phase θ is decreased (by subtracting 150°). Therefore, it can also be mentioned that the following configuration may be adopted. The dead time compensation portion 44 adds or subtracts the initial phase difference θA (herein, adds) 90° with respect to the value of the electric angle phase θ of the rotor 21 obtained by the position detection portion 41 and further performs subtraction of 150°. In a case where the value of the electric angle phase θ after the 150° subtraction is positive, the value obtained by multiplying the compensation amount ΔVd with the polarity of the q-axis current command iq_ref is added to the voltage command Vw_ref in the W phase which is input to the dead time compensation portion 44 to be output. On the other hand, in a case where the value of the electric angle phase θ after the 150° subtraction is negative, the value obtained by multiplying the compensation amount ΔVd with the polarity of the q-axis current command iq_ref is subtracted from the voltage command Vw_ref in the W phase to be output.

Figure 16:
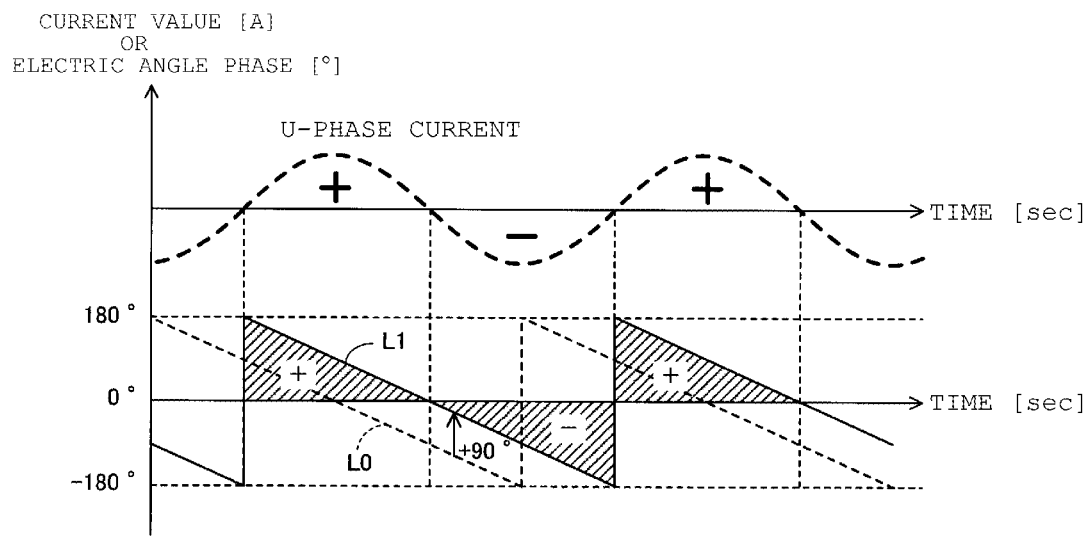
FIG. 16 is an explanatory diagram illustrating a waveform of a U-phase current and a change of the electric angle phase of the above-mentioned rotor with respect to the time elapse in a case where a rotation speed of the above-mentioned rotor is negative.

FIG. 16 is an explanatory diagram illustrating both a waveform of the U-phase current in the case of the rotation speed <0 (positive torque) and the change with respect to the time elapse of the electric angle phase θ of the rotor 21. It should be noted however that the q-axis current command iq_ref≥0 is set. In the case of the rotation speed<0, the change with respect to the time elapse of the electric angle phase θ is opposite to the case of the rotation speed≥0, and the electric angle phase θ indicates a transition where the electric angle phase θ is decreased with respect to the time elapse. However, even in this case too, the processing related to the dead time compensation is similar to the case of the rotation speed≥0.

In the above explanation, it has been described that the first phase, the second phase, and the third phase are respectively set as the U phase, the V phase, and the W phase. However, for example, the V phase, the W phase, and the U phase may correspond to the first phase, the second phase, and the third phase in the stated order or may also be correspond to the W phase, the U phase, and the V phase.

In the above explanation, it has been described that the electric angle phase θ of the rotor 21 is set in the range between −180° and +180°, but a range between 0° and +360° may also be used. In this case, while +180° is set as a reference, a range higher than or equal to +180° and lower than +360° is set to correspond to positive, and a range higher than or equal to 0° and lower than +180° is set to correspond to negative, it is possible to perform the dead time compensation similar to that of the present embodiment.

The calculation of the compensation amount ΔVd and the dead time compensation in a case where the motor 2 is driven in the three phases including the U phase, the V phase, and the W phase has been described above, but the method according to the present embodiment is not limited to the three-phase motor and can also be applied to a case where the motor is driven in four or more phases. In this case too, advantages similar to those of the present embodiment can be attained.

The calculation of the compensation amount ΔVd and the dead time compensation described according to the present embodiment can be applied to a system where an error is generated in the output voltage to the motor when the dead time is prepared, and this error needs to be compensated. Therefore, a motor set as a target of the drive control may be a motor other than the BLDC motor. For example, it is also possible to apply the calculation of the compensation amount ΔVd and the dead time compensation described according to the present embodiment to a drive control of an induction machine (induction motor).

It should be noted that the motor drive system 1 described according to the present embodiment can also be represented as follows. That is, the motor drive system 1 includes the motor 2, the PWM inverter 3 that outputs the voltage to the motor 2 by converting a voltage command into a pulse width modulation (PWM) pulse and switching on and off of the respective switching elements (33u, 34u, and the like) which are mutually connected in series by the above-mentioned PWM pulse, and the motor drive control device 4 that drives and controls the motor 2 by using the PWM inverter 3, and the motor drive control device 4 has a configuration including the dead time compensation portion 44 according to the present embodiment.

The embodiments of the present invention have been described above, but the scope of the present invention is not limited to this and can be carried out by adding various modifications without departing from the gist of the invention. In addition, the above-mentioned embodiments and modified examples thereof cam be arbitrarily combined with each other.

The present invention can be used for the motor drive control device that compensates the error in the output voltage generated when the dead time is prepared in the drive control of the motor, for example.

Features of the above-mentioned preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A motor drive control device that drives and controls a motor by using a pulse width modulation (PWM) inverter that converts a voltage command into a PWM pulse and outputs a voltage to the motor by switching on and off of respective switching elements connected in series to each other by the PWM pulse, the motor drive control device comprising:
a dead time compensation portion that obtains a compensation amount to compensate for an error of an output voltage of the PWM inverter which is generated when a dead time to avoid simultaneous turning-on of the respective switching elements connected in series to each other is prepared in the PWM inverter and outputs the voltage command obtained by taking the compensation amount into account to the PWM inverter; wherein
the dead time compensation portion obtains the compensation amount based on a magnitude of a current command vector indicating a vector of a current to be followed by the current flowing through the motor; and
the current command vector is a vector defined by a coordinate system in synchronism with a rotor of the motor or an equivalent coordinate system.

2. The motor drive control device according to claim 1, wherein the current command vector is a resultant vector of respective components of a d-axis current command and a q-axis current command in a dq coordinate system including a d axis and a q axis.

3. The motor drive control device according to claim 2, wherein the dead time compensation portion obtains the compensation amount based on a magnitude of the current command vector when the d-axis current command is set as 0 [A].

4. The motor drive control device according to claim 3, wherein
when a previously determined fixed value of the compensation amount is set as ΔVd', the q-axis current command is set as iq_ref(t) [A] while a time t is set as a variable, and a current threshold is set as ith [A], the dead time compensation portion determines ΔVd obtained by a calculation based on a following expression as the compensation amount:

$$\Delta Vd = \Delta Vd' \times |iq\_ref(t)|/ith.$$

5. The motor drive control device according to claim 4, wherein the dead time compensation portion determines the fixed value ΔVd' as the compensation amount ΔVd in a case where an absolute value |iq_ref(t)| of the q-axis current command is higher than or equal to the current threshold ith.

6. The motor drive control device according to claim 3, further comprising:
a position detection portion that detects an electric angle phase of the rotor based on an output signal from a position sensor that outputs a signal in accordance with a rotation position of the rotor of the motor;
the dead time compensation portion obtains a polarity of the compensation amount based on the q-axis current command and the electric angle phase of the rotor.

7. The motor drive control device according to claim 6, wherein
the position detection portion detects the electric angle phase in a range between −180° and +180'; and
when a phase difference in electric angles at a timing when a current command with regard to a first phase of the motor becomes 0 [A] and a timing when the electric angle phase of the rotor becomes 0° is set as an initial phase difference, the dead time compensation portion shifts the value of the electric angle phase by adding or subtracting the initial phase difference with respect to a value of the electric angle phase of the rotor obtained by the position detection portion and adds a value obtained by multiplying the compensation amount by a polarity of the q-axis current command to the voltage command in the first phase input to the dead time compensation portion to output the added value in a case where the shifted value of the electric angle phase is positive, and subtracts the value obtained by multiplying the compensation amount by the polarity of the q-axis current command from the voltage command in the first phase to output the subtracted value in a case where the shifted value of the electric angle phase is negative.

8. The motor drive control device according to claim 7, wherein, when the compensation amount is added or subtracted with respect to a voltage command in a second phase with a delay of 120° in the electric angle with respect to the first phase of the motor, the dead time compensation portion further subtracts 120° from the shifted value of the electric angle phase and adds the value obtained by multiplying the compensation amount by the polarity of the q-axis current command to the voltage command in the second phase input to the dead time compensation portion to output the added value in a case where the value of the electric angle phase after the subtraction of 120° is positive, and subtracts the value obtained by multiplying the compensation amount by the polarity of the q-axis current command from the voltage command in the second phase to output the subtracted value in a case where the value of the electric angle phase after the subtraction of 120° is negative.

9. The motor drive control device according to claim 7, wherein, when the compensation amount is added or subtracted with respect to a voltage command in a third phase with a lead of 120° in the electric angle with respect to the first phase of the motor, the dead time compensation portion further adds 120° to the shifted value of the electric angle phase and adds the value obtained by multiplying the compensation amount by the polarity of the q-axis current command to input to the voltage command in the third phase input to the dead time compensation portion to output the added value in a case where the value of the electric angle phase after the addition of 120° is positive, and subtracts the value obtained by multiplying the compensation amount by the polarity of the q-axis current command from the voltage command in the third phase to output the subtracted value in a case where 120° the value of the electric angle phase after the addition of 120° is negative.

\* \* \* \* \*